(12) United States Patent
Hu et al.

(10) Patent No.: US 10,922,846 B2
(45) Date of Patent: Feb. 16, 2021

(54) METHOD, DEVICE AND SYSTEM FOR IDENTIFYING LIGHT SPOT

(71) Applicant: GUANGDONG VIRTUAL REALITY TECHNOLOGY CO., LTD., Shenzhen (CN)

(72) Inventors: Yongtao Hu, Shenzhen (CN); Jingwen Dai, Shenzhen (CN); Jie He, Shenzhen (CN)

(73) Assignee: GUANGDONG VIRTUAL REALITY TECHNOLOGY CO., LTD., Shenzhen (CN)

( * ) Notice: Subject to any disclaimer, the term of this patent is extended or adjusted under 35 U.S.C. 154(b) by 170 days.

(21) Appl. No.: 16/314,444

(22) PCT Filed: Aug. 29, 2017

(86) PCT No.: PCT/CN2017/099544
§ 371 (c)(1),
(2) Date: Dec. 31, 2018

(87) PCT Pub. No.: WO2019/041147
PCT Pub. Date: Mar. 7, 2019

(65) Prior Publication Data
US 2019/0385340 A1    Dec. 19, 2019

(51) Int. Cl.
*G06T 7/90* (2017.01)
*G06T 7/11* (2017.01)
(Continued)

(52) U.S. Cl.
CPC ............... *G06T 7/90* (2017.01); *G06T 5/20* (2013.01); *G06T 7/11* (2017.01); *H04N 1/60* (2013.01); *G06T 2207/10024* (2013.01)

(58) Field of Classification Search
CPC ... G06T 7/90; G06T 7/11; G06T 7/136; G06T 7/194; G06T 7/70; G06T 5/20;
(Continued)

(56) References Cited

U.S. PATENT DOCUMENTS 8,638,988 B2 * 1/2014 Russ .................. G06T 7/70
382/103
10,095,928 B2 * 10/2018 Beall .................. G06T 7/70
(Continued)

FOREIGN PATENT DOCUMENTS

| CN | 101447029 A | 6/2009 |
| CN | 102938053 A | 2/2013 |

(Continued)

OTHER PUBLICATIONS

"Danger Detection from Head Light Glare through Vision Esimation"; Suchart Pharadornpanitchakul, 2013 13th International Symposium on Communications and Information Technologies (ISCIT) (Year: 2013).*

(Continued)

*Primary Examiner* — Michael S Osinski

(57) ABSTRACT

A method for identifying light spot, image processing device, and image processing device, and non-transitory computer readable storage medium are disclosed herein. An example method involves: receiving a first image corresponding to a light spot image, wherein the first image is an image of the light spot image displayed in a first color space; converting the first image into a second image, wherein the second image is an image of the light spot image displayed in a second color space; and identifying the light spot with a target color in the second image according to a preset color identifying condition of the second color space.

20 Claims, 6 Drawing Sheets

(51) Int. Cl.
*G06T 5/20* (2006.01)
*H04N 1/60* (2006.01)

(58) Field of Classification Search
CPC . G06T 2207/10024; G06T 2207/30204; G06T 2207/10016; G06T 2207/10048; G06T 2207/20036; H04N 1/60; H04N 1/6027; H04N 1/6086; H04N 9/73; H04N 5/2256; H04N 5/2354; G06K 9/4652; G06K 9/4661
See application file for complete search history.

(56) References Cited

U.S. PATENT DOCUMENTS

| | | | |
|---|---|---|---|
| 10,204,424 B2* | 2/2019 | Li | G06K 9/4652 |
| 2007/0091111 A1* | 4/2007 | Gutta | H04N 9/73 |
| | | | 345/591 |
| 2007/0132759 A1* | 6/2007 | Mallick | G06T 5/30 |
| | | | 345/426 |
| 2007/0242162 A1* | 10/2007 | Gutta | H04N 9/73 |
| | | | 348/645 |
| 2009/0033801 A1* | 2/2009 | Gutta | H04N 9/73 |
| | | | 348/708 |
| 2009/0141039 A1* | 6/2009 | Ramanath | G09G 3/346 |
| | | | 345/590 |
| 2009/0175536 A1* | 7/2009 | Gutta | H04N 9/73 |
| | | | 382/166 |
| 2013/0005458 A1* | 1/2013 | Kosta | A63F 13/25 |
| | | | 463/31 |
| 2013/0169797 A1* | 7/2013 | Min | G06K 9/4652 |
| | | | 348/135 |
| 2013/0223679 A1* | 8/2013 | Russ | G06T 7/90 |
| | | | 382/103 |
| 2014/0160318 A1* | 6/2014 | Blanquart | A61B 1/00009 |
| | | | 348/234 |
| 2015/0161488 A1* | 6/2015 | Okumura | G06K 15/1868 |
| | | | 358/1.9 |
| 2015/0304522 A1* | 10/2015 | Van Herpen | H04N 21/4627 |
| | | | 380/210 |
| 2017/0019614 A1* | 1/2017 | Tsukada | G02B 5/208 |
| 2017/0085768 A1* | 3/2017 | Van Der Sijde | H05B 45/10 |
| 2017/0161571 A1* | 6/2017 | Zhao | B60Q 9/00 |
| 2018/0164667 A1* | 6/2018 | Wang | G03B 21/2073 |

FOREIGN PATENT DOCUMENTS

| | | |
|---|---|---|
| CN | 103186905 A | 7/2013 |
| CN | 103310201 A | 9/2013 |

OTHER PUBLICATIONS

"A Fast and Robust Intelligent Headlight Controller for Vehicles"; Jonathan H. Connell, 2011 IEEE Intelligent Vehicles Symposium ( IV) (Year: 2011).*

"Improving light spot tracking for an automatic headlight control algorithm"; Jittu Kurian, Proceedings of the 16th International IEEE Annual Conference on Intelligent Transportation Systems (ITSC 2013), The Hague, The Netherlands, Oct. 6-9, 2013 (Year: 2013).*

International Search Report issued in corresponding International application No. 2017099544, dated May 30, 2018 (15 pages).

* cited by examiner

METHOD, DEVICE AND SYSTEM FOR IDENTIFYING LIGHT SPOT

TECHNICAL FIELD

The present disclosure generally relates to the field of computer technology, and more particularly, to a method for identifying light spot and an image processing device.

BACKGROUND

Virtual reality technology can provide a head mounted device with virtual display effects. Furthermore, the interactive control technology is also an important research aspect in virtual reality (VR)/augmented reality (AR)/mixed reality (MR) of the virtual reality technology. The interactive control technology has contributed to the rapid development of the VR/AR/MR. In the field of VR/AR/MR, the controller (handle) acts as an important device for the interactive control, providing strong support for the interactive control. The human-computer interaction function can be realized by operating the control keys (buttons, triggers, trackpads, etc.).

At present, optical ways for tracking and positioning the controller, such as an infrared tracking method or adding a flashing light spot, is usually used to enhance the user's virtual reality experience. However, the infrared tracking method needs special equipment while the flashing light spot has latency in identification, thus a complete strobe period is required to identify the flashing light spot, and the frequency of the light spot strobe needs to be precisely controlled.

SUMMARY

The present disclosure aims to overcome the defects in the related art and provides a method, device and system for identifying a light spot.

According to an aspect of the present disclosure, a method for identifying a light spot, includes: receiving a first image corresponding to a light spot image, the first image is an image of the light spot image displayed in a first color space; converting the first image into a second image, the second image is an image of the light spot image displayed in a second color space; and identifying the light spot with a target color in the second image according to a preset color identifying condition of the second color space.

According to some embodiments of the present disclosure, the color identifying conditions includes a plurality sets of threshold intervals of color parameters, each set of the threshold intervals corresponding to a given color, and each set of the threshold intervals of color parameters including a plurality of threshold intervals of a color parameter, the color parameter being defined by the second color space, and the threshold of each threshold interval determined by the given color.

According to some embodiments of the present disclosure, identifying the light spot with the target color in the second image according to the color identifying condition of the second color space includes: comparing the at least one color parameter of the second image with the plurality sets of the threshold intervals to obtain a result; and determining the light spot with a target color according to the result.

According to some embodiments of the present disclosure, identifying the light spot with the target color in the second image according to the color identifying condition of the second color space includes: analyzing distribution of the at least one color parameter of the second image displayed in the second color space; adjusting the threshold interval of color parameters according to the distribution.

According to some embodiments of the present disclosure, receiving a first image corresponding to the light spot image includes: receiving a raw image of the light spot image acquired by an image sensor; processing the raw image to obtain the image of the light spot image displayed in the first color space as the first image.

According to some embodiments of the present disclosure, prior to identifying the light spot with the target color in the second image according to the preset color identifying conditions of the second color space, further includes: filtering a noisy light spot in the first image or the second image, a difference between a size of the noisy light spot and a size of the light spot is over a difference threshold.

According to some embodiments of the present disclosure, the first color space is an RGB space, and the second color space is an HSV space.

According to some embodiments of the present disclosure, each set of the threshold intervals includes at least a threshold interval of an H parameter, the threshold interval of the H parameter following $(H_{center}-h_{thres})<H<(H_{center}+h_{thres})$, wherein H is the H parameter, $H_{center}$ is a preset value of the H parameter corresponding to the given color, and $h_{thres}$ is a tolerance corresponding to the given color.

According to some embodiments of the present disclosure, determining the threshold interval of the H parameter includes: converting different colors into the HSV space; normalizing the H parameter to obtain a normalized H parameter; determining correspondences between a plurality of given colors and the normalized H parameter, and defining a threshold interval as the threshold interval of the H parameter corresponding to the color.

According to some embodiments of the present disclosure, the $h_{thres}$ corresponding to a pure color is smaller than the $h_{thres}$ corresponding to a mixed color.

According to some embodiments of the present disclosure, each set of the threshold intervals further includes a threshold interval of an S parameter, the threshold interval of the S parameter follows $(s_{min\_thres})<S<(s_{max\_thres})$, wherein S is the S parameter, $s_{min\_thres}$ is a preset saturation of an minimum threshold corresponding to the given color, and $s_{max\_thres}$ is a preset saturation of an maximum threshold corresponding to the given color.

According to some embodiments of the present disclosure, the method further includes setting the $s_{min\_thres}$ and $s_{max\_thres}$ according to a saturation of a whole or partial of the second image.

According to some embodiments of the present disclosure, each set of the threshold intervals further includes a threshold interval of a V parameter, the threshold interval of the V parameter follows $(v_{min\_thres})<V<(v_{max\_thres})$, wherein V is a parameter V, $v_{min\_thres}$ is a preset brightness of an minimum threshold of the given color, and $v_{max\_thres}$ is a preset brightness of an maximum threshold of the given color.

According to some embodiments of the present disclosure, further include setting the $v_{min\_thres}$ and $v_{max\_thres}$ according to a brightness of a whole or partial of the second image.

According to another aspect of the present disclosure, an image processing device, is provided. The image processing device includes: one or more processors; and memory storing one or more programs configured to be executed by the one or more processors, the one or more programs including: instructions for: receiving a first image corresponding to a light spot image, wherein the first image is an image of the light spot image displayed in a first color space; converting the first image into a second image, wherein the second image is an image of the light spot image displayed in a second color space; and identifying the, light spot with a target color in the second image according to a preset color identifying condition of the second color space.

According to an embodiment of the image processing device, the image processing device further including an image sensor, the image sensor is connected to the processor for acquiring image data.

According to an embodiment of the image processing device, the one or more programs further include instructions for: a plurality sets of threshold intervals of color parameters, each set of the threshold intervals corresponding to a given color, and each set of the threshold intervals of color parameters comprising a plurality of threshold intervals of a color parameter, the color parameter being defined by the second color space, and the threshold of each threshold interval determined by the given color.

According to an embodiment of the image processing device, the one or more programs further include instructions for: comparing the at least one color parameter of the second image with the plurality sets of the threshold intervals to obtain a result; and determining the light spot with a preset color according to the result.

According to an embodiment of the image processing device, the one or more programs further include instructions for: analyzing distribution of the at least one color parameter of the second image displayed in the second color space; adjusting the threshold interval of the at least one color parameter corresponding to the color according to the distribution.

According to another aspect of the present disclosure, a non-transitory computer readable storage medium storing one or more programs configured to be executed by one or more processors of an electronic device, the one or more programs comprising instruction for: receiving a first image corresponding to a light spot, image, wherein the first image is an image of the light spot image displayed in a first color space; converting the first image into a second image, wherein the second image is an image of the light spot image displayed in a second color space; and identifying the light spot with a target color in the second image according to a preset color identifying condition of the second color space.

The embodiments of the present disclosure can identify the light spot of the target color in the second image according to the color identification condition of the second color space. The identifying result can be exported without delay and only needing the image information of the current frame. Further, the method requires a simple device, as long as a point light source of different colors is set on the controller. Only the color identification conditions need to be modified according to different target color light spots and no hardware device changes are needed, meanwhile, a plurality of controllers are supported to be used together.

DETAILED DESCRIPTION

To describe the technical solutions in the embodiments of the present disclosure more clearly, the following briefly introduces the accompanying drawings required for describing the embodiments of the present disclosure or the prior art. Apparently, the accompanying drawings in the following description show merely some embodiments of the present disclosure, and a person of ordinary skill in the art may still derive other drawings from these accompanying drawings without creative efforts.

Figure 1:
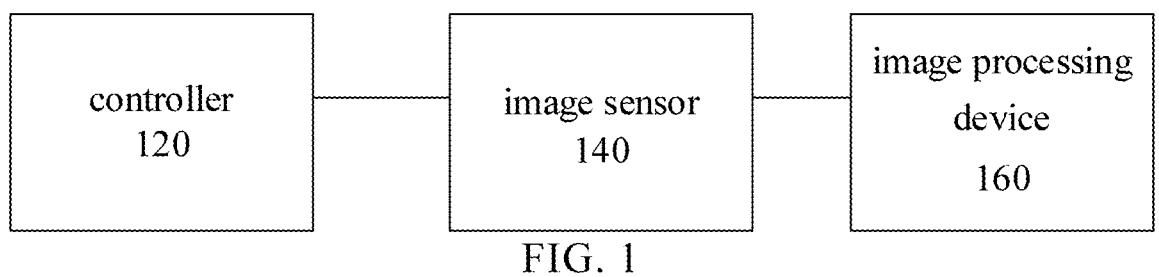
FIG. 1 illustrates a schematic diagram of a position tracking system, according to some embodiments of the disclosure.

FIG. 1 illustrates a schematic diagram of a position tracking system, according to some embodiments of the disclosure. As illustrated in FIG. 1, in some embodiments, the position tracking system 100 may include a controller 120, an image sensor 140, and an image processing device 160.

The controller 120 may be a gamepad with a point light source, a pointing stick, a somatosensory mouse, and the like. The number of the controller can be one or more. The number of the light spot sources of each controller can also be one or more. The light spot source may be an LED light illuminating from a point to surrounding space.

According to some embodiments of the disclosure, the light spot source may be an LED light formed by pure color light like red, green, or blue. The LED light can also be obtained by different color light, for example, a purple or pink LED light, which may be obtained by mixed light of red and blue. The shape of the LED light can be spherical, hemispherical, triangular, pentagram, and the like.

The image of the controller 120 acquired by the image sensor 140 may include a light spot image. The light spot image includes a background and light spots distributed over the background. The light spot is formed by the point light source. The image processing device 160 may track and position the controller 120 based on the light spot image on the controller 120. The light spot image is captured by the image sensor 140.

Compared with the related art, the embodiments of the present disclosure can directly track and position the controller based on the light spot image of the point light source on the controller acquired by the image sensor. The requirement for controlling the point light source and the frequency of the point light source is avoided. The control requirements of the image processing device can be reduced, and it is unnecessary to adjust the image sensor to be matched with the tracking and positioning of the controller.

The image sensor 140 can be any image sensing device capable of capturing an object images within its field of view, and used for carrying out exposure imaging of on the light source on the controller 120 to obtain a raw image. In some embodiments, the image sensor 140 may not have a fixed position, for example, it may be worn by a user (e.g. be worn as a portion of the head mounted display) and can move along with the user. As illustrated in FIG. 1. the image sensor 140 is arranged on the headset. In some embodiments, the image sensor 140 may be placed in a fixed position, such as, it may be placed on a table or a shelf. The image sensor 140 may be configured to capture images of objects within its field of view at different positions.

The image sensor 140 may be a Complementary Metal Oxide Semiconductor (CMOS) sensor, or a Charge-coupled Device (CCD) sensor, and the like.

In some embodiments, the image sensor 140 can be configured to capture a plurality of images at different points within a period of time, for example, when the controller 120 moves within the field of view of the image sensor 140, the image sensor 140 may capture images of the controller 120 at different positions during the time period. The image sensor 140 can also obtain time information when capturing each image. The image sensor 140 may also send the time information along with the images to the image processing device 160 for further processing. In some embodiments of the present disclosure, the image processing device 160 may be configured to track and position the controller 120 by identifying light spots included in the image.

After exposure imaging, in addition to the point light source and the graphics formed by shooting, spot-like pattern formed by other objects in the environment (such as fluorescent lamps, etc.) is inevitably present in the raw images due to the influence of an actual imaging environment. After the raw image is acquired by the image sensor 140, the raw image may also be sent to the image processing device 160. The image processing device 160 first process the raw image to eliminate the influence of the spot-like patterns formed by other objects. It can also be processed in the process of identifying the light spot.

As illustrated in FIG. 1, the image sensor 140 can communicate with the image processing device 160 and send image data to the image processing device 160. The image sensor 140 may also receive a command signal from the image processing device 160 for setting parameters of capturing an image. Exemplary parameters for capturing an image may include exposure time, aperture, image resolution/size, field of view (e.g., zooming in and out), and/or color space of the image (e.g., color or black or white) and/or parameters used to perform other types of known functions of the camera. The image sensor 140 and the controller 120 may be connected via network, bus or other type of data link (e.g., hardwired, wireless (e.g., Bluetooth™) or other connection way known in the art.

The image processing device 160 may be an entity with good computing power such as an embedded processor, a digital image processor, a smart phone, a computer, a tablet, a notebook, and the like. The image processing device may have an image sensor or not.

Image processing device 160 can be configured to receive and process data/signals from other components of the system. For example, the image processing device 160 can receive and process image data from the image sensor 140 and input data from the controller 120 as disclosed of the present disclosure. The image processing device 160 may also transmit data/signals to other components of the system, which can perform certain functions based on data/signals from the image processing device 160.

Figure 2:
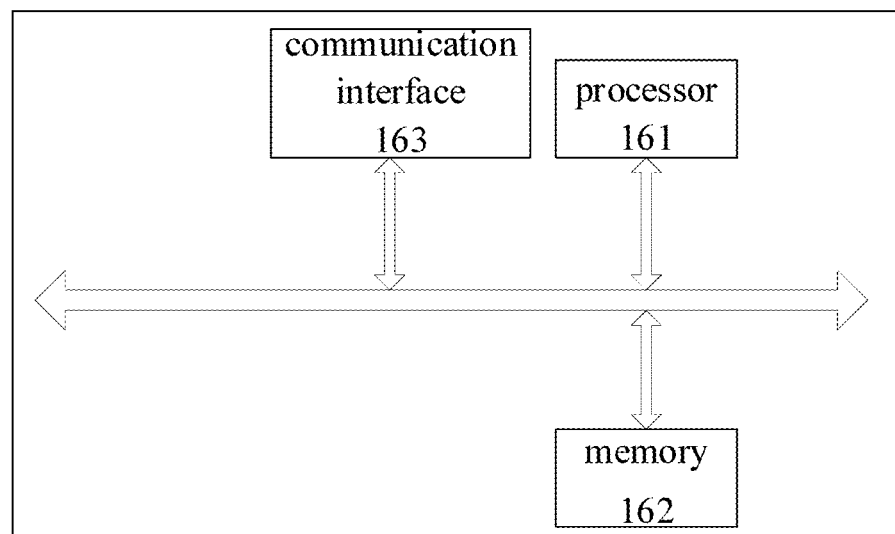
FIG. 2 illustrates a diagram of an image processing device, according to some embodiments of the disclosure.

As illustrated in FIG. 2, the image processing device 160 may include a processor 161, a memory 162, and a communication interface 163 in some embodiments.

The processor 161 may include any suitable type of general purpose or special purpose microprocessor, digital signal processor or microcontroller. The processor 161 can be configured as a separate processor module dedicated to position the object tracked. Alternatively, the processor can be configured as a shared processor module for performing other functions irrelevant to tracking objects. Moreover, the processor 161 can be configured to receive data and/or signals from various components of the system via network, for example, it can also process data and/or signals to determine one or more operating conditions in the system. For example, the processor 161 can receive an image from the image sensor 140 and determine if the image includes an identification pattern, and the processor 161 can also determine a landmark point in the identified pattern. Additionally or alternatively, the processor 161 can determine the size and number of the landmark points includes in the identified pattern. The processor 161 can also determine t the tracking target based on the determined size and/or number of the landmark points.

The memory 162 can includes any suitable type of mass storage that provides any type of information for storing that the processor may need to operate. The memory can be volatile or nonvolatile, magnetic, semiconductor, magnetic, optical, erasable, non-erasable or other type of storage device or tangible (i.e. non-transitory) computer readable medium. Including but not limited to ROM, flash memory, dynamic RAM and static RAM. The memory 162 can be used to store one or more computer programs of exemplary object tracking positioning functions that can be executed by the processor 161 and disclosed of the disclosure. For example, the memory 162 can be used to store programs that can be executed by the processor 161.

The memory 162 can further be used to store information and data used by the processor 161. For example, the memory 162 can be used to store a lookup table that includes identification patterns and parameters corresponding to the identification patterns. The processor can determine the identity of the identification pattern by querying the lookup table if the identification pattern is acquired.

The communication interface 163 can be used to facilitate communication between controllers and other components of the system by network. For example, the image processing device 160 may receive input data/signals from the controller via the communication interface 163 to control role in the game. The image processing device 160 may also transmit data/signals to other displays for presenting games (such as images, videos and/or sound signals) via the communication interface 163.

The network may include or partially include kinds of networks or one or more other types of communication connections known to those skilled in the art. The network may include network connections, buses or other types of data links, such as hardwired or other connections known in the art. For example, the network may include Internet, an intranet, a local area network or other wireless/hardwired connection, or other means of connection (e.g., Bluetooth, Wi-Fi, 4G, LTE cellular data network, etc.). The components of the system communicate by the network.

The image processing device 160 may include a display device. In some embodiments, the display device may be part of a computer (e.g., a screen of a laptop, etc.). In other embodiments, the display device can be a display device (e.g., LED, OLED or LCD) or the like separating from an independent standard television, HDTV, digital television, or any type of terminal (e.g., a gaming console).

Figure 3:
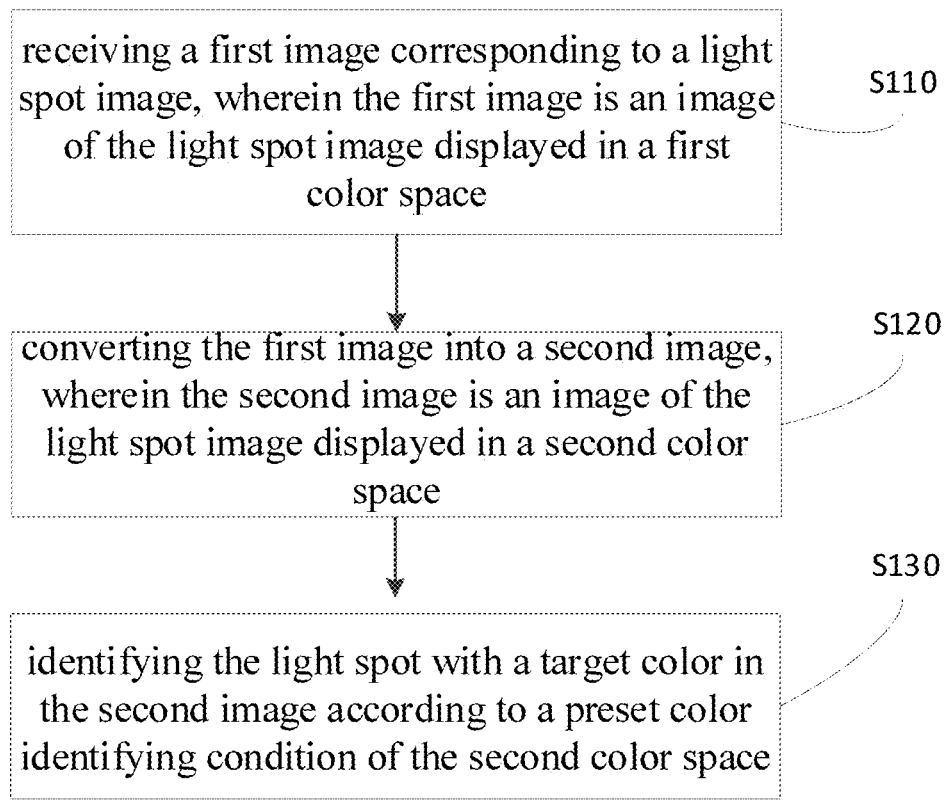
FIG. 3 illustrates a flow chart of a method for identifying a light spot, according to some embodiments of the disclosure.

A method for identifying a light spot according to the point light source of the controller 120 will be described below with reference to the figures. The light spot identifying method may be applied to the tracking and positioning system illustrated in FIG. 1. As illustrated in FIG. 3, the method may include following steps.

At block S110, a first image can be received corresponding to a light spot image, wherein the first image is an image of the light spot image in a first color space.

In some embodiments, the image sensor 140 can continuously capture images. Additionally, or alternatively, the captured images may be triggered by a special event or data/signal transmitted from the terminal or the controller 120. For example, user can switch on the input device of the controller 120. The controller 120 can transmit a signal for activating the image sensor 140 to capture one or more images based on the user's input. Alternatively, the controller 120 can transmit input data to the image processing device 160. The image processing device 160 can activate the image sensor 140 to capture one or more images.

In some game events, the captured image may be triggered by the controller 120. Additionally, or alternatively, the system may also include a sensor for detecting an internal object within the field of view of the image sensor 140, for example, an ultrasonic sensor may be used to detect one or more objects in the field of view the image sensor 140. In this embodiment, the image sensor 140 can be activated to take a picture to obtain one or more images when an object is detected.

In some embodiments, the image sensor 140 sends an acquired raw image directly to the image processing device 160. In some embodiments, the image sensor 140 can optionally process the captured raw image and send the processed image to the image processing device 160. For example, the image sensor 140 may convert the raw image to an RGB image and send the RGB image to the image processing device 160. The image sensor 140 can also increase/decrease the contrast and/or brightness of the image.

In some embodiments, the image sensor 140 may receive parameters for capturing images from the image processing device 160. Exemplary parameters for capturing images may include parameters for setting exposure time, aperture, image resolution/size, viewing light field (zoom in and out), and/or color space of the image (e.g., color or black or white), and/or parameters used to perform other types of known functions of the camera. For example, in some embodiments, the exposure parameter of the image sensor can be set to a low exposure parameter to filter out similar color objects in the environment, such as $\frac{1}{10}$ of normal exposure.

At this block, the image sensor 140 acquires the raw image of the light spot image. In the light spot image, the number of the light spots corresponds to the number of point light sources within the collection range of the image sensor 120. For example, the number of point light sources in the range of the image sensor 140 is two, the number of light spots in the raw image can also be two.

The raw image can be converted to an image within a color space after the raw image of the spot image is obtained. The color space can include color spaces such as RGB, LAB, YCbCr, HSV, and the like. Each color space includes at least three color parameters, for example, the RGB space includes an R value, a G value, and a B value, the HSV space includes an H value, an S value, a V value.

In some embodiments, the image processing device 160 obtains the raw image of the light spot image acquired by the image sensor, and process the raw image to obtain an image of the light spot image in the first color space as the first image. For example, the color information of an image can be reconstructed by Debayer or Demosaic interpolation algorithm.

In some embodiments, the image sensor 140 may directly convert the raw image of the spot image to the first image, and transmit the first image to the image processing device 160.

In some embodiments, in order to avoid misidentification, it is optional that filtering a noisy light spot in the first image or the raw image wherein a difference value between a size of the noisy light spot and preset size of the light spot in usage scenario is over a threshold, that is, filtering noisy light points which are too large or small compared to the preset size of the light spot.

At block S120, the first image can be converted into a second image, wherein the second image is an image of the light spot image in a second color space.

Images in different color spaces can be converted to each other, for example, RGB image can be converted to YCbCr or HSV image. The image processing device converts the first image into an image in the second color space. In some embodiments, the specific conversion algorithm may be based on the first color space, the second color space, and the relationship between the first color space and the second color. The specific conversion algorithm can use the existing color space conversion algorithm, which will not be described here.

In some embodiments, the image processing device 160 selectively processes the first image before conversing the first image to the second image to increase a conversation efficiency. For example, the image processing device 160 can adjust the image size to reduce the computational requirements. Additionally, or alternatively, the light spot of the identified image is more easily to be identified by reducing the noisy light spot, sharpening and/or increasing or decreasing the contract or the brightness of the first image. It can be understood that other types of image processing techniques can also be used.

At block S130, the light spot with a target color can be identified in the second image according to a preset color identifying condition of the second color space.

For each color space, a color identification condition may be set in advance, and the color identification condition may include a number of sets of threshold intervals of color parameters, and each set of the threshold intervals corresponds to a given color. For example, for a given color C1, C2, C3, . . . , the threshold intervals are T1, T2, T3, . . . , respectively. In general, if the given colors are close, the threshold intervals are also close, and different given colors correspond to different threshold intervals. The number of the threshold intervals can also be set according to actual needs, for example, two threshold intervals are needed to be segmented in the second color space when the number of the target color is two, seven threshold intervals can be segmented when the number of the target color is seven. Compared with the complicated equipment in the related art, the point light source supporting multiple IDs can be easily disposed, and only the threshold intervals of the color space need to be subdivided according to requirements.

In this embodiment, each set of the threshold intervals includes a number of threshold interval of at least one color parameter in the second color space corresponding to the given color. Assuming that the second color space includes color parameters A1, A2, and A3, the same set of threshold intervals includes at least a threshold interval of color parameter A1 corresponding to the given color. The set of threshold intervals may further include a threshold interval of color parameter A2 or a threshold interval of color parameter A3 corresponding to the given color.

In some embodiments, identifying the light spot with the target color in the second image according to the preset color identifying condition of the second color space include: comparing the at least one color parameter of the second image with the plurality of sets of the threshold intervals to obtain a result, and determining the light spot with the target color according to the result. Assuming that the threshold interval corresponding to the target color is T1, comparing the color parameter of the second image with T1, if the color parameter of the second image falls within the range of T1, the light spot of the target color can be determined in the second image. If the color parameter of the second image does not fall within the range of T1, it indicates that there is no light spot of the target color in the second image.

In some embodiments, the distribution of one or more colors parameters of the second image in the second color space may be analyzed first. The threshold interval of color parameter corresponding to the given color is adaptively adjusted according to the distribution condition.

Furthermore, after the light spot of the target color is identified in the second image according to actual requirements, the light spot of different target color can be segmented.

The image processing device 160 can identify the spot of the target color in the second image by using the color identification condition of the second color space. Only the image information of a current frame is needed during the identifying process, and the identify result can be output without delay. Furthermore, the device is simple, and a point light source of different colors is set on the controller. Only the color identification conditions need to be modified according to different target color spots, and no changes is needed on the hardware device.

The above method will be described in detail below with the RGB space as the first color space and the HSV space as the second color space.

Figure 4:
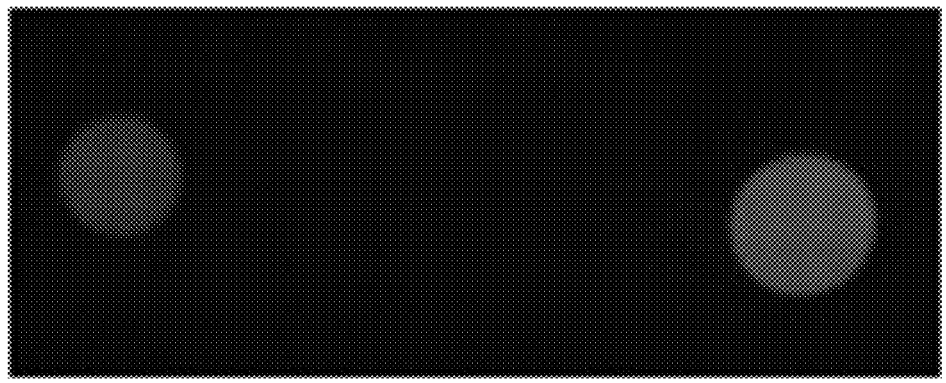
FIG. 4 illustrates an exemplary schematic diagram of a raw image of a light spot image, according to some embodiments of the disclosure.
Figure 5:
FIG. 5 illustrates an exemplary schematic diagram of a first image, according to some embodiments of the disclosure.

First, a raw image of the light spot image is received (as illustrated in FIG. 4), then an image of the raw image in the RGB space is received (as illustrated in FIG. 5), and then the image in the RGB space is converted to an image in the HSV space. The conversion method can adopt existing conversion algorithm, and will not be described here.

The image of the light spot image in the HSV space is compared with a plurality of sets of preset threshold intervals of the HSV space, and the spot of the target color is determined according to the comparison result.

In the HSV space, H represents Hue, S represents Saturation, and V represents Value. H parameter, S parameter, and V parameter are the color parameters defined by the color space. Therefore, when other objects in the environment have rare chances to be similar to the point source imaging, each set of threshold intervals may only include a threshold interval of an H parameter. In order to increase the accuracy of the identification, each set of threshold intervals may also include a threshold interval of an S parameter corresponding to the given color, or a threshold interval of a V parameter corresponding to the given color, or a combination of the three. In the case of two or more threshold intervals of two or more color parameters combinations, when the color parameters satisfy both or all of the threshold intervals, the target color light spot can be determined.

In some embodiments, each set of the threshold intervals includes at least a threshold interval of the H parameter corresponding to the given color, and the threshold interval of the H parameter corresponding to the given color following:

$$(H_{center} - h_{thres}) < H < (H_{center} + h_{thres}),  \quad (1)$$

wherein H is the H parameter, $H_{center}$ is a preset value of the H parameter corresponding to the given color, and $h_{thres}$ is a tolerance corresponding to the given color.

The method of determining the threshold interval of the H parameter include following steps.

Figure 6:
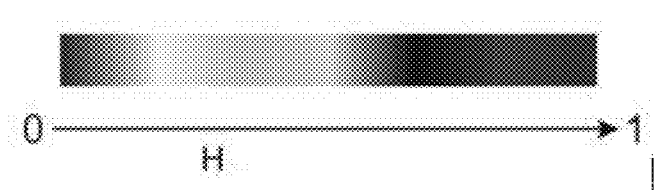
FIG. 6 illustrates a correspondences schematic diagram between colors and the normalized H parameter, according to some embodiments of the disclosure.

Converting the different colors into the HSV space, normalizing the H parameter to obtain a normalized H parameter, determining correspondences between a plurality of given colors and the normalized H parameter, and defining a threshold interval as the threshold interval of the H parameter. FIG. 6 illustrates a schematic diagram of the correspondences between the normalized H parameters and different colors according to some embodiments of the disclosure. The color strips in FIG. 6 to FIG. 8 indicate that when the H parameter of the HSV space increases from 0 to 1, the colors in RGB spaces may be correspondingly, for example, red, yellow, green, cyan, blue, purple, pink. The FIG. 8 is only an example, the specific range of a given color can be wider or narrower.

Figure 7:
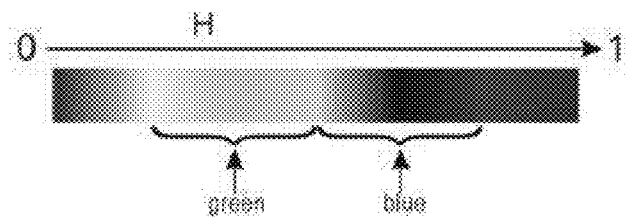
FIG. 7 illustrates an exemplary schematic diagram of the threshold interval of the H parameter corresponding to two colors, according to some embodiments of the disclosure.
Figure 8:
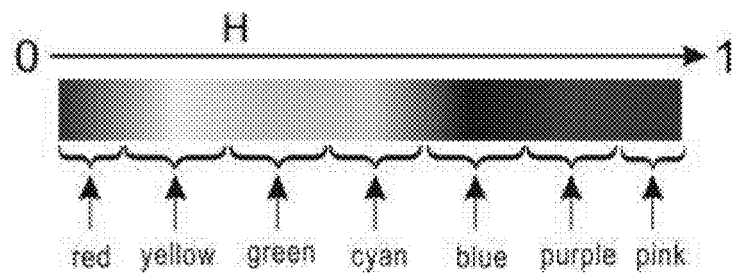
FIG. 8 illustrates an exemplary schematic diagram of the threshold interval of the H parameter corresponding to seven colors, according to some embodiments of the disclosure.

Referring to FIG. 7, if the target color light spot has only two colors, for example, green and blue, only the green light spot and blue light spot need to be recognized, and the set pf the threshold intervals can be segmented according to the method of dividing the H parameter illustrated in FIG. 7.

If the target color light spot has more colors, more color may be acquired by subdividing the H parameter. For example, the target color light spot has seven colors, the H parameter can be subdivided according to the method illustrated in FIG. 8. In the same way, more threshold intervals corresponding to more given colors can be also obtained.

In some embodiments, the $h_{thres}$ corresponding to the pure color can be smaller than the $h_{thres}$ corresponding to the mixed color.

In some embodiments, each set of the threshold intervals includes a threshold interval of S parameter corresponding to the given color, and the threshold interval of S parameter following:

$$(s_{min\_thres}) < S < (s_{max\_thres}),  \quad (2)$$

wherein S is the S parameter, $s_{min\_thres}$ is a preset saturation of an minimum threshold corresponding to the given color, and $s_{max\_thres}$ is a preset saturation of an maximum threshold corresponding to the given color.

Furthermore, the $s_{min\_thres}$ and $s_{max\_thres}$ can be adaptively adjusted according to a saturation of a whole or partial of the second image.

In some embodiments, each set of the threshold intervals further includes a threshold interval of V parameter corresponding to the given color, and the threshold interval of the V parameter following:

$$(v_{min\_thres}) < V < (v_{max\_thres}), \quad (3)$$

wherein V is a parameter V, $v_{min\_thres}$ is a preset brightness of an minimum threshold of the given color, and $v_{max\_thres}$ is a preset brightness of an maximum threshold of the given color.

Further, the $v_{min\_thres}$ and $v_{max\_thres}$ can be adaptively adjusted according to a brightness of a whole or partial of the second image.

A combination of equations (1), (2), and (3) can also be used to identify light spots of different target colors.

For example, taking the cyan in FIG. 8 as the target color, the condition for identifying the target color can be set in advance as follows:

$H_{center}=0.5$,
$h_{thres}=1/12=0.0833$,
$s_{min\_thres}=0.15$, $s_{max\_thres}=1.0$,
$v_{min\_thres}=0.25$, $v_{max\_thres}=1.0$.

In the specific setting process, in order to increase the stability and anti-interference of the identification of light spot, a stricter threshold can be used for judgment. For example, the value of $h_{thres}$ can be reduced. It is also possible to appropriately increase the $h_{thres}$ value which corresponding to the mixed color to improve the influence of misidentification caused by color unevenness, and different colors corresponding to different $h_{thres}$. For example, the $h_{thres}$ corresponding to the pure color R/G/B can be appropriately reduced, and the $h_{thres}$ corresponding to the mixed color (yellow, cyan, purple, pink, e.g.) can be improved.

Figure 9:
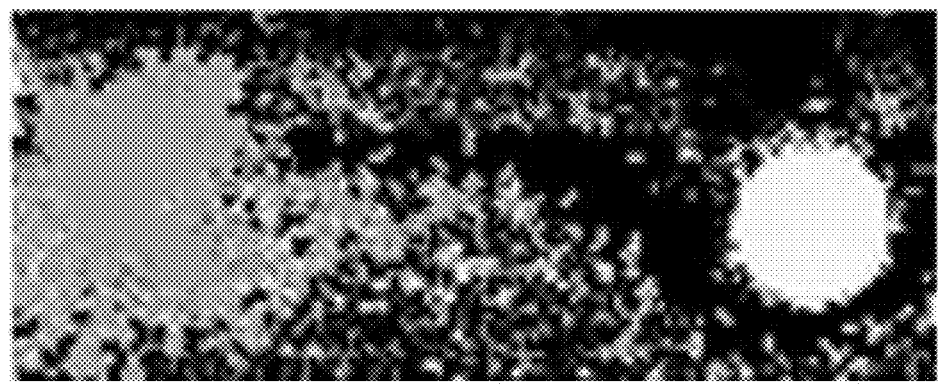
FIG. 9 illustrates an H component of the first image shown in FIG. 5 in an HSV space.
Figure 10:
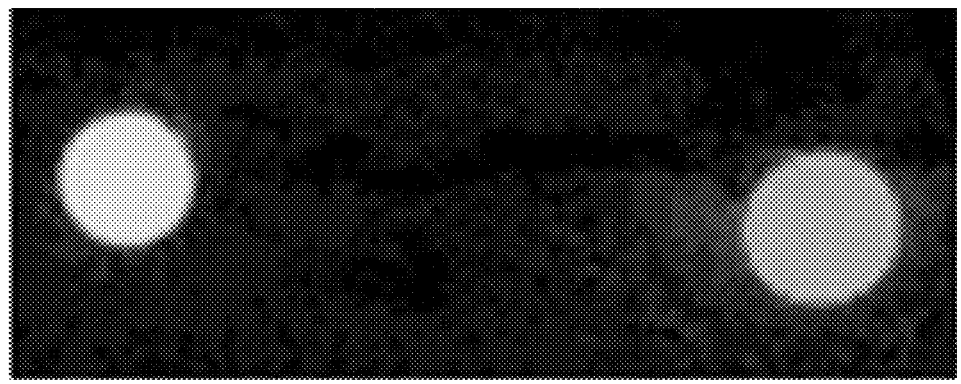
FIG. 10 illustrates a V component of the first image shown in FIG. 5 in an HSV space.
Figure 11:
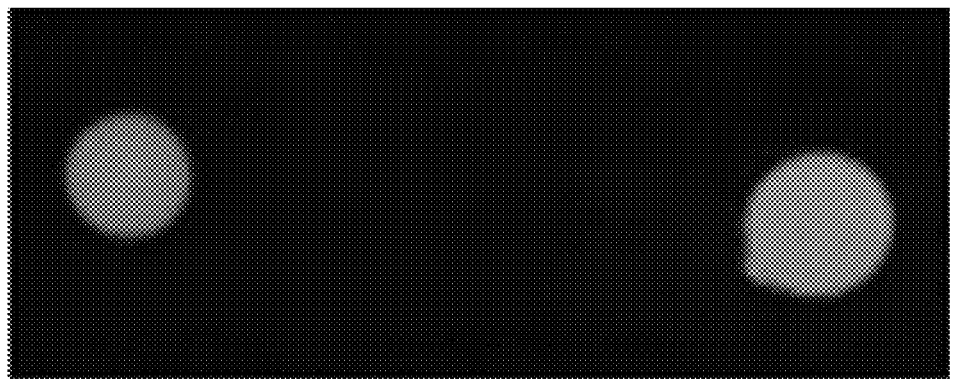
FIG. 11 illustrates the S component of the first image shown in FIG. 5 in an HSV space.
Figure 12:
FIG. 12 illustrates a blue light spot identified in FIG. 5.
Figure 13:
FIG. 13 illustrates a pink light spot identified in FIG. 5.

FIG. 9 to FIG. 11 correspondingly illustrates the H/V/S components of the first image illustrated in FIG. 5 in an HSV space. In the process of identifying the light spot in FIG. 5 (assuming that FIG. 5 include blue B light spot and pink P light spot), the H/V/S component of the second image is compared with the threshold intervals of H/V/S parameter to obtain a comparison result, wherein the threshold of the threshold intervals of H/V/S are preset and related to the blue light spot and pink light spot. The blue light spot and the pink light spot is finally determined according to the comparison result. If the H/V/S components of the second image falls in the threshold interval corresponding to blue, the blue light spot can be determined (as illustrated in FIG. 12), if the H/V/S component of the second image falls in the threshold interval corresponding to pink, the pink light spot can be determined (as illustrated in FIG. 13).

Figure 14:
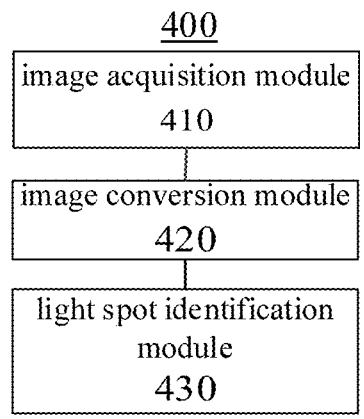
FIG. 14 illustrates a structural block diagram of a light spot identifying device, according to some embodiments of the disclosure.

Referring to FIG. 14, the present disclosure further provides a light spot identification device 400. The light spot identification device 400 include an image acquisition module 410, an image conversion module 420, and a light spot identification module 430. The image acquisition module 410 is used to obtain a first image corresponding to the light spot image, wherein the first image is an image of the light spot image in a first color space; the image conversion module 420 is used to convert the first image into a second image, wherein the second image is an image of the spot image in a second color space; the light spot identification module 430 is used to identify the light spot of target color in the second image according to the preset color identifying condition of the second color space.

According to some embodiments of the present disclosure, the color identifying condition includes a number of sets of threshold intervals, and each set of the threshold intervals corresponds to a given color. Each set of the threshold intervals includes a number of threshold intervals of a color parameter. The color parameter is defined by the second color space, and the threshold of each of threshold interval is determined by the given color.

The image acquisition module 410 is further used to receive a raw image of the light spot image acquired by the image sensor and process the raw image to obtain the image of the light spot image displayed in the first color space as the first image.

The image conversion module 420 is further used to filter a noisy light spot in the first image or the second image, wherein a difference between a size of the noisy light spot and a size of the light spot is over a difference threshold.

In some embodiments, the light spot identification module 430 is further used to compare the at least one color parameter of the second image with the plurality sets of the threshold intervals to obtain a result, and determining the light spot with a target color according to the result.

In other embodiments, the light spot identification module 430 is further used to analyze the distribution of the at least one color parameter of the second image displayed in the second color space. The threshold interval of one color parameter is then adjusted according to the distribution condition.

Optionally, wherein the first color space is an RGB space, and the second color space is an HSV space. Each set of the threshold intervals includes at least a threshold interval of the H parameter corresponding to the given color, and the threshold interval of the H parameter following $(H_{center}-h_{thres}) < H < (H_{center}+h_{thres})$, wherein H is the H parameter, $H_{center}$ is a preset value of the H parameter corresponding to the given color, and $h_{thres}$ is a tolerance corresponding to the given color.

Optionally, the $h_{thres}$ corresponding to a pure color is smaller than the $h_{thres}$ corresponding to a mixed color.

Optionally, each set of the threshold intervals further includes a threshold interval of an S parameter corresponding to the given color, and the threshold interval of the S parameter following $(s_{min\_thres}) < S < (s_{max\_thres})$, wherein S is the S parameter, $s_{min\_thres}$ is a preset saturation of an minimum threshold corresponding to the color, and $s_{max\_thres}$ is a preset saturation of an maximum threshold corresponding to the given color. The $s_{min\_thres}$ and $s_{max\_thres}$ can be set according to a saturation of a whole or partial of the second image.

Optionally, each set of the threshold intervals further includes a threshold interval of a V parameter corresponding to the given color, and the threshold interval of the V parameter following $(v_{min\_thres}) < V < (v_{max\_thres})$, wherein V is a parameter V, $v_{min\_thres}$ is a preset brightness of an minimum threshold of the given color, and $v_{max\_thres}$ is a preset brightness of an maximum threshold of the given color. The $v_{min\_thres}$ and $v_{max\_thres}$ can be set according to a brightness of a whole or partial of the second image.

Figure 15:
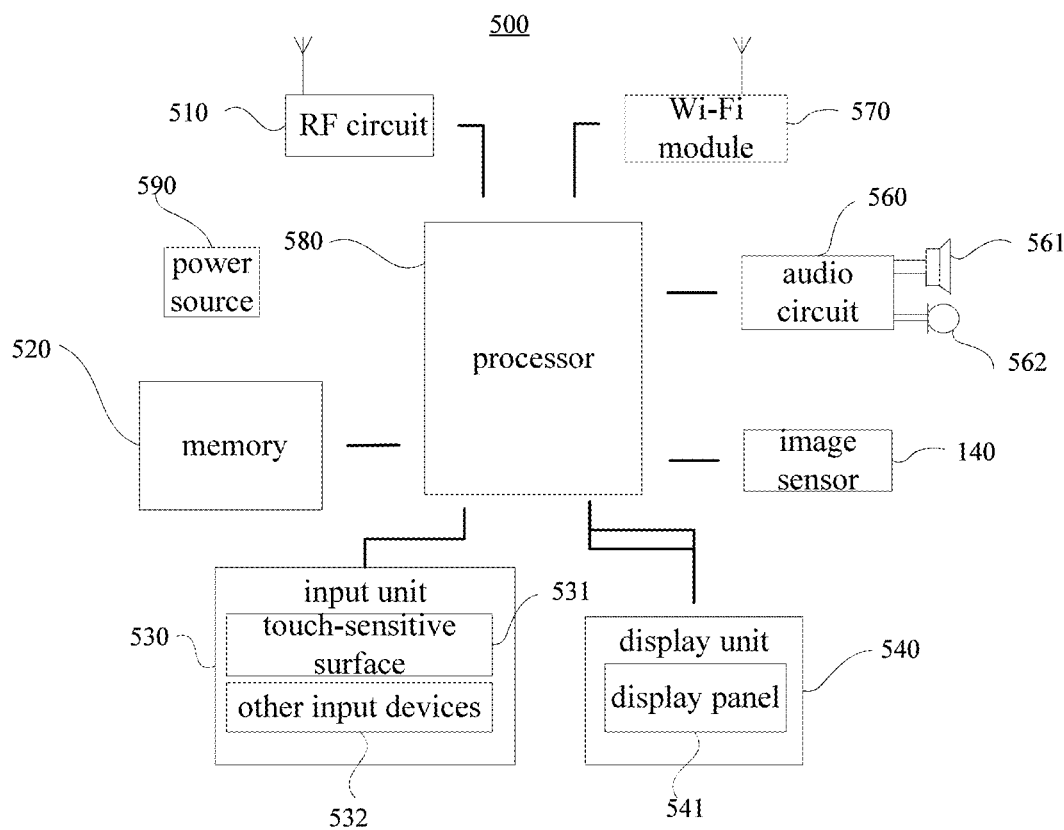
FIG. 15 illustrates a structural block diagram of a terminal, according to some embodiments of the disclosure.

Referring to FIG. 15, the present disclosure further provides a terminal 500. The terminal 500 may include an Radio Frequency (RF) circuit 510, a memory 520 including at least one computer readable storage media, an input unit 530, a display unit 540, an image sensor 140, an audio circuit 5160, a wireless fidelity (WiFi) module 570, a processor 580 including one or more processing cores, and a power source 590 and the like. It will be understood by those skilled in the art that the terminal structure illustrated in FIG. 8 does not constitute a limitation to the terminal. The terminal 500 may include more or less components than those illustrated, or a combination of certain components, or different component arrangements.

The RF circuit 510 is used to receive and transmit signals during the transmission or reception of information or during a call. Specifically, after receiving the downlink information of the base station, the RF circuit 510 can transmit the downlink information to one or more processors 580 to process. In addition, the RF circuit 510 can transmit the data related to the uplink to the base station. Generally, the RF circuit 510 include but is not limited to, an antenna, at least one amplifier, a tuner, one or more oscillators, a SIM (Subscriber Identity Module) card, a transceiver, a coupler, an Low Noise Amplifier (LNA), a duplexer, etc. In addition, the RF circuitry 510 can also communicate with the network and other devices via wireless communication. The wireless communication may follow any communication standard or protocol, including but not limited to Global System of Mobile communication (GSM), General Packet Radio Service (GPRS), Code Division Multiple Access (CDMA). Wideband Code Division Multiple Access (WCDMA), Long Term Evolution (LTE), e-mail, Short Messaging Service (SMS), and the like.

The memory 520 is used to store software programs and modules. The processor 580 executes various functional applications and data processing by running software programs and modules stored in the memory 520. The memory 520 may mainly include storage program store and storage data store, wherein the storage program store may store an operating system, an application program required for at least one function (such as a sound playing function, an image playing function, etc.), and the like. The storage data store may store data (such as audio data, phone book, etc.) created according to the use of the terminal 500, and the like. Moreover, the memory 520 can include high speed random access memory and non-volatile memory, such as at least one magnetic disk storage device, flash memory device, other kinds volatile solid state storage device. Correspondingly, the memory 520 may also include a memory controller to provide access to the memory 520 for the processor 580 and the input unit 530.

The input unit 530 can be used to receive input numeric or character information and to generate keyboard, mouse, joystick, optical or trackball signal inputs related to user settings and function controls. In particular, input unit 530 can include touch-sensitive surface 531 and other input devices 532. The touch-sensitive surface 531, also referred to touch display or trackpad can collect touch operations on or near itself. The operations were made by the user (e.g. the user operates on or near the touch-sensitive surface 531 using any suitable object or accessory, such as a finger, stylus, or the like.) and driving the corresponding connecting device according to a preset program. Alternatively, the touch-sensitive surface 531 can include a touch detection device and a touch controller, wherein the touch detection device detects the touch orientation of the user and detects a signal brought by the touch operation, transmitting the signal to the touch controller. The touch controller receives the touch information from the touch detection device and converts the touch information into contact coordinates, transmitting the touch information to the processor 580. The touch controller is further used to receive commands from the processor 580 and execute them. In addition, the touch-sensitive surface 531 can be of various types such as resistive, capacitive, infrared, and surface acoustic waves. Except the touch-sensitive surface 531, the input unit 530 can also include other input devices 532. Specifically, the other input devices 532 may include but not limited to one or more physical keyboard, function keys (such as volume control buttons, switch buttons, etc.), trackballs, mice, joysticks, and the like.

The display unit 540 can be used to display information entered by the user or information provided to the user and various graphical user interfaces of terminal 500. The graphical user interfaces can be made of graphics, text, icons, video, and any combination thereof. The display unit 540 can include a display panel 541. Alternatively, the display panel 541 can be a Liquid Crystal Display (LCD) or an Organic Light-Emitting Diode (OLED), or the like. Further, the touch-sensitive surface 531 can cover the display panel 541, when the touch-sensitive surface 531 detects a touch operation thereon or nearby, the touch-sensitive surface 531 would transmit the operation to the processor 580 to determine the type of the touch. After that, the processor 580 provides a corresponding visual output on display panel 541 according to the touch event. As illustrated in FIG. 8, the touch-sensitive surface 531 and the display panel 541 are implemented as two separate components to implement input and input functions. However, in some embodiments, the touch-sensitive surface 531 also can be integrated with display panel 541 for input and output function.

The terminal 500 may include at least one other type of sensor except image sensor 140, such as a light sensor, a motion sensor, and the like. Specifically, the light sensor may include an ambient light sensor and a proximity sensor, wherein the ambient light sensor may adjust the brightness of the display panel 541 according to the brightness of the ambient light. The proximity sensor may close the display panel 541 and/or backlight when the terminal 500 moves to the ear. As one of the motion sensors, the gravity acceleration sensor can detect the magnitude of acceleration in each direction (usually three axes) and the gravity and the magnitude and direction of gravity when stationary. Further, the gravity acceleration sensor can be used to identify the gesture of the mobile phone (such as horizontal and vertical screen switching, related Game, magnetometer attitude calibration), vibration identification related functions (such as pedometer, tapping), etc. Other sensors such as gyroscopes, barometers, hygrometers, thermometers, infrared sensors that can be configured in the terminal 500 will not be described here.

Audio circuit 560, speaker 561, and microphone 562 can provide an audio interface between the user and the terminal 500. The audio circuit 560 can transmit the converted electrical data of the received audio data to the speaker 561. The speaker 561 may convert the electrical data into a sound signal and output. Further, the microphone 562 may converts the collected sound signal into an electrical signal and received by audio circuit 560, it would be converted into audio data and processed by the processor 580 and transmitted to the terminal via the RF circuit 510. Another way is that the audio data may outputted to the memory 520 for further processing. The audio circuit 560 may also include an earbud jack to provide communication of the peripheral earphones with the terminal 500.

Wi-Fi is a kind of short-range wireless transmission technology. The terminal 500 can help users to send and receive emails, browse web pages, and visit streaming media through the Wi-Fi module 570, which provides wireless broadband internet visit for users. It can be understood that although FIG. 15 illustrates the Wi-Fi module 570, but it is not an essential configuration of the terminal 500, it can be omitted without changing the essence of the disclosure.

The processor 580 is the control center of the terminal 500, which connects various portions of the terminal 500 using various interfaces and lines. The processor 580 can perform overall monitoring of the mobile phone by running or executing software programs and/or modules stored in memory 520 and recalling data stored in memory 520, as a result, the various functions and processing data of the terminal 500 are performed. Optionally, the processor 580 may include one or more processing cores, also, the processor 580 may integrate an application processor and a modem processor. The application processor mainly used to process an operating system, a user interface, an application, and the like. The modem processor mainly used to process the wireless communications. It can be understood that the modem processor above may also not be integrated into the processor 580.

The terminal 500 also includes a power source 590 (such as a battery) that supplies power to the various components. The power source can be logically coupled to the processor 580 through a power management system to manage functions such as charging, discharging, and power management. The power supply 590 may also include one or more of those DC or AC power source, a recharging system, a power failure detection circuit, a power converter or inverter, a power status indicator, and the like.

The terminal 500 may further include a camera, a Bluetooth module, and the like, and the details are not described herein. Specifically, in this embodiment, the display unit of the terminal is a touch screen display. The terminal may also include a memory, one or more programs stored in the memory and used to executed by the one or more processors. The one or more programs include instructions as receiving a first image corresponding to a light spot image, wherein the first image is an image of the light spot image displayed in a first color space and converting the first image into a second image, wherein the second image is an image of the light spot image displayed in a second color space and identifying the light spot with a target color in the second image according to a preset color identifying condition of the second color space.

The specific implementation manner of the method is the same as the implementation manner of the method for identifying a light spot described above, and details are not described herein again.

In order to optimize the motion tracking system, the embodiment of the present disclosure further discloses a second motion tracking system. The difference between the second motion tracking system and the motion tracking system illustrated in FIG. 1 is that the image sensor and the image processing device are integrated in the terminal. The terminal may be a head-mounted display device, a smart phone, a notebook computer, a tablet computer, a smart wearable device, etc.

The controller 120 can communicate with the terminal, and typically held by the user in one or both hands to facilitate the input keys operation or the like. When playing a game or performing a virtual reality event, the user can interact with one or more characters in the game. For example, the controller 120 can receive input information from the user and transmit the signal to the terminal based on the input information above. The terminal can process the signal and/or change the game based on the signal. In some embodiments, the controller 120 can receive data/signals from the terminal for controlling its components. For example, the terminal may transmit an interaction request or the like, and the controller 120 can receive the interaction request and make corresponding feedback. For example, the user may open a function by eyes to control terminal (for example, a head mounted display device), and the terminal sends a corresponding request to the controller 120, the controller 120 start a vibration after receiving the request to remind the user of operating.

In summary, the method, device, and system provided by the embodiments of the present disclosure can identify the light spot of the target color in the second image according to the color identification condition of the second color space. The identifying result can be exported without delay and only needing the image information of the current frame. Further, the method requires a simple device, as long as a point light source of different colors is set on the controller. Only the color identification conditions need to be modified according to different target color light spots and no hardware device changes are needed, meanwhile, a plurality of controllers are supported to be used together.

In the embodiments provided by the present invention, it should be understood that the disclosed method may also be implemented in other manners. The embodiments described above are merely illustrative, for example, the flowcharts and block diagrams in the figures illustrate the architecture, functionality, and operation of possible implementations of methods and computer program products according to embodiments of the present invention. In this regard, each block of the flowchart or block diagram can represent a module, a program segment, or a portion of code that includes one or more of the Executable instructions. It should also be noted that, in some alternative implementations, the functions noted in the blocks may also occur in a different order than those illustrated in the drawings. For example, two consecutive blocks may be executed substantially in parallel, and they may sometimes be executed in the reverse order, depending upon the functionality involved. It is also noted that each block of the block diagrams and/or flowcharts, and combinations of blocks in the block diagrams and/or flowcharts, can be implemented in a dedicated hardware-based system that performs the specified function or function. Or it can be implemented by a combination of dedicated hardware and computer instructions.

In addition, each functional module in each embodiment of the present invention may be integrated to form a separate part, or each module may exist separately, or two or more modules may be integrated to form a separate part.

The functions, if implemented in the form of software functional modules and sold or used as separate products, may be stored in a computer readable storage medium. Based on such understanding, the technical solution of the present invention, which is essential or contributes to the prior art, or a part of the technical solution, may be embodied in the form of a software product, which is stored in a storage medium, including the instructions are used to cause a computer device (which may be a personal computer, server, or network device, etc.) to perform all or part of the steps of the methods described in various embodiments of the present invention. The foregoing storage medium includes: a U disk, a mobile hard disk, a read-only memory (ROM), a random access memory (RAM), a magnetic disk, or an optical disk, and the like, which can store program code. It should be noted that, in this context, relational terms such as first and second are used merely to distinguish one entity or operation from another entity or operation, and do not necessarily require or imply such entities or operations. There is any such actual relationship or order between them. Furthermore, the term "comprises" or "comprises" or "comprises" or any other variants thereof is intended to encompass a non-exclusive inclusion, such that a process, method, article, or device that comprises a plurality of elements includes not only those elements but also Other elements, or elements that are inherent to such a process, method, item, or device. An element that is defined by the phrase "comprising a . . . " does not exclude the presence of additional equivalent elements in the process, method, item, or device that comprises the element.

The above description is only the preferred embodiment of the present invention, and is not intended to limit the present invention, and various modifications and changes can be made to the present invention. Any modifications, equivalent substitutions, improvements, etc. made within the spirit and scope of the present invention are intended to be included within the scope of the present invention. It should be noted that similar reference numerals and letters indicate similar items in the following figures, and therefore, once an item is defined in a drawing, it is not necessary to further define and explain it in the subsequent drawings.

The above is only the specific embodiment of the present invention, but the scope of the present invention is not limited thereto, and any person skilled in the art can easily think of changes or substitutions within the technical scope of the present invention. It should be covered by the scope of the present invention. Therefore, the scope of the invention should be determined by the scope of the claims.

What is claimed is:

1. A method for identifying a light spot, comprising:
   receiving a first image corresponding to a light spot image, wherein the first image is an image of the light spot image displayed in a first color space;
   converting the first image into a second image, wherein the second image is an image of the light spot image displayed in a second color space; and
   identifying the light spot with a target color in the second image according to a preset color identifying condition of the second color space, wherein the color identifying condition comprises a plurality sets of threshold intervals of color parameters, each set of the threshold intervals of the color parameters corresponds to a given color, and each set of the threshold intervals of the color parameters comprises a plurality of threshold intervals of the color parameter, the color parameter is defined by the second color space, and a threshold of each threshold interval is determined by the given color.

2. The method of claim 1, wherein identifying the light spot with the target color in the second image according to the color identifying condition of the second color space comprises:
   comparing the at least one color parameter of the second image with the plurality sets of the threshold intervals to obtain a result; and
   determining the light spot with a target color according to the result.

3. The method of claim 1, wherein identifying the light spot with the target color in the second image according to the color identifying condition of the second color space comprises:
   analyzing distribution of the at least one color parameter of the second image displayed in the second color space; and
   adjusting the threshold intervals of color parameters according to the distribution.

4. The method of claim 1, wherein receiving a first image corresponding to the light spot image comprises:
   receiving a raw image of the light spot image acquired by an image sensor;
   processing the raw image to obtain the image of the light spot image displayed in the first color space as the first image.

5. The method of claim 1, prior to identifying the light spot with the target color in the second image according to the preset color identifying conditions of the second color space, the method further comprising:
   filtering a noisy light spot in the first image or the second image, wherein a difference between a size of the noisy light spot and a size of the light spot is over a difference threshold.

6. The method of claim 1, wherein the first color space is an RGB space, and the second color space is an HSV space.

7. The method of claim 6, each set of the threshold intervals comprising at least a threshold interval of an H parameter corresponding to the given color, the threshold interval of the H parameter following $(H_{center}-h_{thres})<H<(H_{center}+h_{thres})$, wherein H is the H parameter, $H_{center}$ is a preset value of the H parameter corresponding to the given color, and $h_{thres}$ is a tolerance corresponding to the given color.

8. The method of claim 7, determining the threshold interval of the H parameter comprising:
   converting different colors into the HSV space;
   normalizing the H parameter to obtain a normalized H parameter;
   determining correspondences between a plurality of given colors and the normalized H parameter, and
   defining a threshold interval as the threshold interval of the H parameter.

9. The method of claim 7, wherein the $h_{thres}$ corresponding to a pure color is smaller than the $h_{thres}$ corresponding to a mixed color.

10. The method of claim 7, wherein each set of the threshold intervals further comprises a threshold interval of an S parameter corresponding to the given color, the threshold interval of the S parameter follows $(s_{min\_thres})<S<(s_{max\_thres})$, wherein S is the S parameter, $s_{min\_thres}$ is a preset saturation of an minimum threshold corresponding to the given color, and $s_{max\_thres}$ is a preset saturation of an maximum threshold corresponding to the given color.

11. The method of claim 10, further comprising:
   setting the $s_{min\_thres}$ and the $s_{max\_thres}$ according to a saturation of a whole or partial of the second image.

12. The method of claim 7, wherein each set of the threshold intervals further comprises a threshold interval of a V parameter corresponding to the given color, the threshold interval of the V parameter follows $(v_{min\_thres})<V<(v_{max\_thres})$, wherein V is a parameter V, $v_{min\_thres}$ is a preset brightness of an minimum threshold of the given color, and $v_{max\_thres}$ is a preset brightness of an maximum threshold of the given color.

13. The method of claim 12, further comprising:
   setting the $v_{min\_thres}$ and the $v_{max\_thres}$ according to a brightness of a whole or partial of the second image.

14. An image processing device, comprising:
   one or more processors; and
   a memory storing one or more programs configured to be executed by the one or more processors, the one or more programs comprising instructions for:
   receiving a first image corresponding to a light spot image, wherein the first image is an image of the light spot image displayed in a first color space;
   converting the first image into a second image, wherein the second image is an image of the light spot image displayed in a second color space; and identifying the light spot with a target color in the second image according to a preset color identifying condition of the second color space, wherein the color identifying condition comprises a plurality sets of threshold intervals of color parameters, each set of the threshold intervals of the color parameters corresponds to a given color, and each set of the threshold intervals of the color parameters comprises a plurality of threshold intervals of the color parameter, the color parameter is defined by the second color space, and a threshold of each threshold interval is determined by the given color.

15. A non-transitory computer readable storage medium storing one or more programs configured to be executed by one or more processors of an electronic device, the one or more programs comprising instructions for:

receiving a first image corresponding to a light spot image, wherein the first image is an image of the light spot image displayed in a first color space;

converting the first image into a second image, wherein the second image is an image of the light spot image displayed in a second color space; and identifying the light spot with a target color in the second image according to a preset color identifying condition of the second color space, wherein the color identifying condition comprises a plurality sets of threshold intervals of color parameters, each set of the threshold intervals of the color parameters corresponds to a given color, and each set of the threshold intervals of the color parameters comprises a plurality of threshold intervals of the color parameter, the color parameter is defined by the second color space, and a threshold of each threshold interval is determined by the given color.

16. The image processing device of claim 14, further comprising an image sensor, wherein the image sensor is connected to the processor for acquiring image data.

17. The image processing device of claim 14, the one or more programs further comprising instructions for:

comparing the at least one color parameter of the second image with the plurality sets of the threshold intervals to obtain a result; and determining the light spot with a target color according to the result.

18. The image processing device of claim 14, the one or more programs further comprising instructions for:

analyzing distribution of the at least one color parameter of the second image displayed in the second color space; and adjusting the threshold interval of color parameters according to the distribution.

19. The image processing device of claim 14, wherein one or more programs further comprising instructions for:

receiving a raw image of the light spot image acquired by an image sensor; and processing the raw image to obtain the image of the light spot image displayed in the first color space as the first image.

20. The image processing device of claim 14, wherein one or more programs further comprising instructions for:

filtering a noisy light spot in the first image or the second image, wherein a difference between a size of the noisy light spot and a size of the light spot is over a difference threshold, prior to identifying the light spot with the target color in the second image according to the preset color identifying conditions of the second color space.

\* \* \* \* \*